United States Patent [19]
Kobayashi

[11] Patent Number: 4,742,214
[45] Date of Patent: May 3, 1988

[54] OPTICAL CARD READER
[75] Inventor: Shoei Kobayashi, Shinagawa, Japan
[73] Assignee: Sony Corporation, Tokyo, Japan
[21] Appl. No.: 908,700
[22] PCT Filed: Jan. 10, 1986
[86] PCT No.: PCT/JP86/00005
§ 371 Date: Sep. 8, 1986
§ 102(e) Date: Sep. 8, 1986
[87] PCT Pub. No.: WO86/04436
PCT Pub. Date: Jul. 31, 1986

[30] Foreign Application Priority Data
Jan. 18, 1985 [JP] Japan .................................. 60-6855
Jan. 21, 1985 [JP] Japan .................................. 60-8691
[51] Int. Cl.⁴ .............................................. G06K 7/14
[52] U.S. Cl. ...................... 235/454; 235/455
[58] Field of Search ............................. 235/455, 454

[56] References Cited
U.S. PATENT DOCUMENTS
4,101,072 7/1978 Weaver ............................. 235/455
4,267,439 5/1981 Thomas ............................ 235/455
4,507,550 3/1985 Fleer ................................. 235/449

Primary Examiner—Harold I. Pitts
Attorney, Agent, or Firm—Hill, Van Santen, Steadman & Simpson

[57] ABSTRACT

The present invention relates to an optical card reader, in which an optical card (1) having a plurality of parallel tracks T in which respective informations are recorded by the arrangement of optically recorded loci so as to be read optically is irradiated with a light source, the reflected light thereon is introduced into a photo detecting element (10) to thereby read the information, the photo detecting element (10) is controlled by scanning means (31) such that it scans each track T a plurality of times, of the plurality of scannings on the track T by the photo detecting element (10), an effective scanning capable of reading the information is detected by effective scanning detecting means 42 and on the basis of the detected output, an output signal of the photo detecting element (10) is extracted by extracting means (45) only during one scanning period of the scanning means 31. Thus, a contrast of a signal corresponding to the optically recorded locus is increased and a correct recorded information can be read stably without reading adjacent two tracks simultaneously.

5 Claims, 7 Drawing Sheets

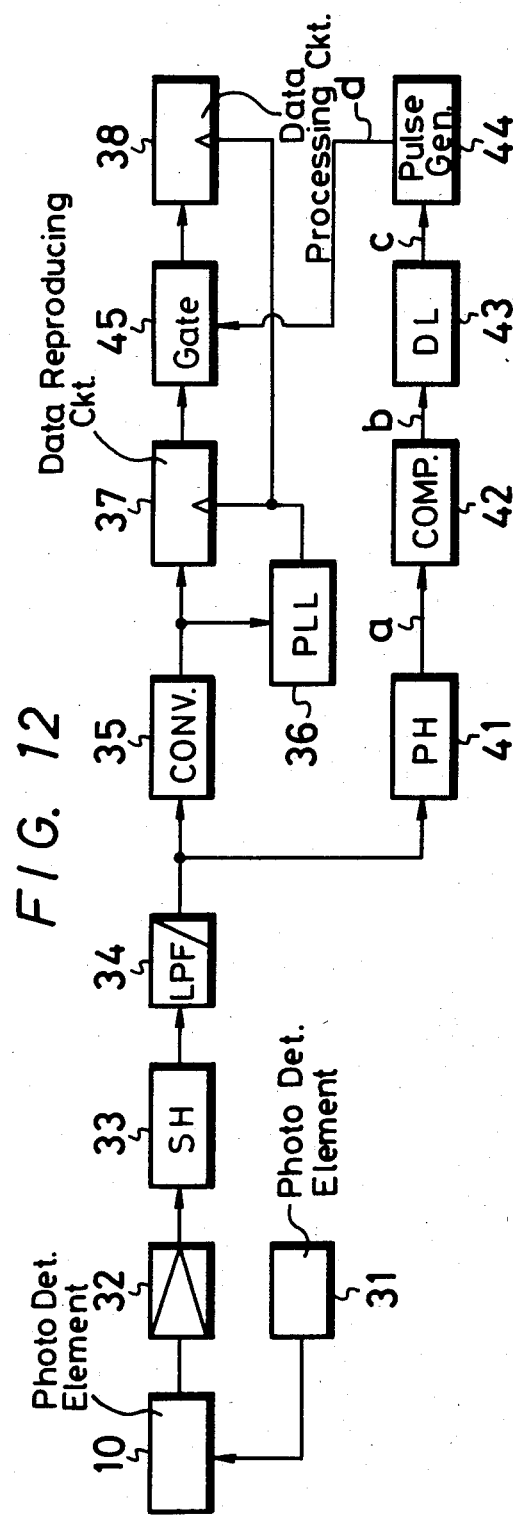
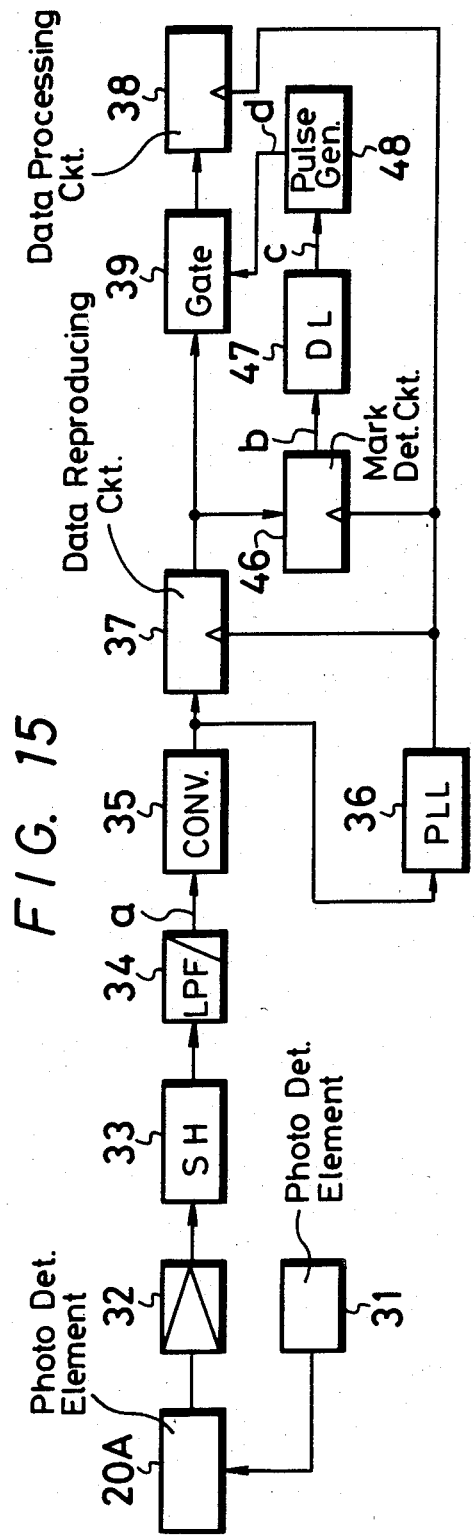
FIG. 12
FIG. 15

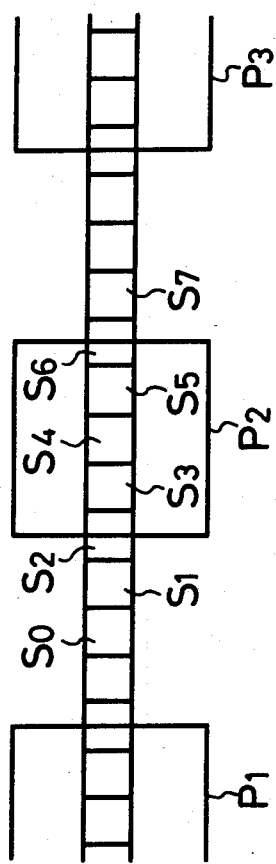
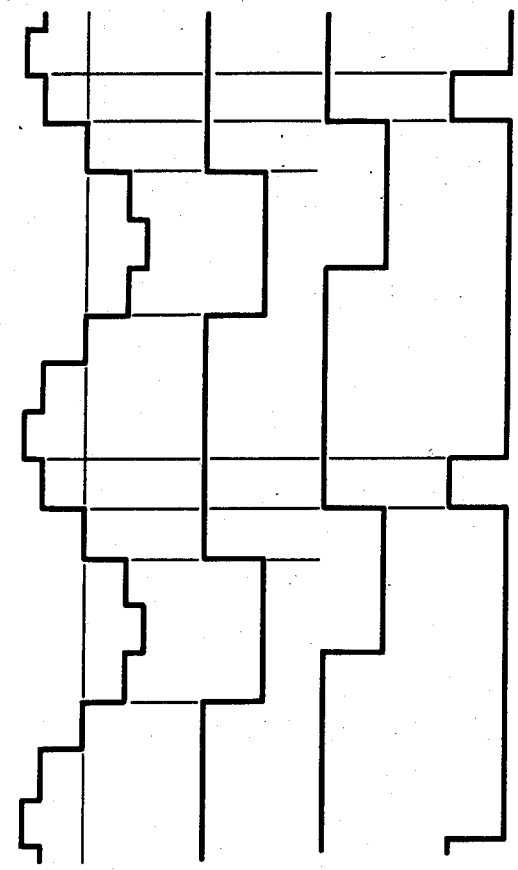
FIG. 13
FIG. 14A
FIG. 14B
FIG. 14C
FIG. 14D

OPTICAL CARD READER

The present invention relates to an optical card reader capable of optically reading an information signal from each track of an optical card in which information signals are recorded on a plurality of parallel tracks by the arrangement of optically recorded loci such that they can be read optically.

BACKGROUND ART

As a so-called memory card or software card, there is known an optical card 1 in which a plurality of tracks T are formed on a rectangular card substrate in parallel to each other and vertical to its reference end face 1a, as shown in FIG. 1 and information signals are respectively recorded in the respective tracks T by the arrangement of optically recorded loci, for example, pits P as shown in FIG. 2, which can be optically read out.

An optical card reader which reads from such card 1 the information signal recorded on each track T is constructed as shown in FIGS. 3 and 4 such that the card 1 inserted into the reader is transported in the direction shown by an arrow 3 along the reference end face 1a of the card 1 by a card feed roller 2, a light 5 from an irradiating light source 4 such as a light-emission diode is introduced onto the track T of the card 1 through a condenser lens 6, a reflected light from the track T, that is, a reading light 7 of the track T is projected through a focusing lens 8 to a photo detecting element 10 supported on a support plate 9 and the reflected light is detected by this photo detecting element 10. The photo detecting element 10 is constructed just like a line sensor made of a CCD (charge coupled device) such that a plurality of photo detecting elements 10a are arranged rectilinearly and the images projected thereon are read out by the electrical scanning. As shown in FIG. 5, on the photo detecting element 10, the longitudinal direction of the image of the track coincides with the arrangement direction of the detecting elements 10a, whereby images P' of all pits on one track are simultaneously focused on the photo detecting element 10 and thus the informations of one track amount can be read at a time.

The electrical arrangement of the prior art optical card reader is as shown, for example, in FIG. 6. As shown in the figure, the photo detecting element 10 is so formed that a plurality of light receiving elements 10r and transfer elements 10t corresponding to the former one by one are respectively located in opposing relation across a gate 10g.

First, the gate 10g is closed during a predetermined period (accumulation period) so that the charge produced by the light is accumulated in each of the light receiving elements 10r. Then, the gate 10g is opened momentarily to transfer the accumulated charges to the corresponding transfer elements 10t in parallel to one another, respectively. Also, the accumulation of the charges is started again in the light receiving elements 10r. The charges transferred to the respective transfer elements 10t are scanned by a scanning signal (read clock) from a scanning circuit 31 and then read out as a series signal during a constant period (scanning period).

Since the accumulation period and the scanning period are same in time period and timing, the term of the scanning period (scanning) will be used in the following explanation.

The read-out signal, which is the output from the photo detecting element 10, is a discrete analog signal produced at the unit of the detecting element 10a. This signal is amplified to a predetermined level by an amplifier 32 and converted through a sample and hold circuit 33 and a low pass filter 34 to a successive analog signal which is then supplied to a comparator 35. The signal inputted to the comparator 35 is converted to a binary coded signal on the basis of the fact that the voltage thereof is higher than or lower than a reference voltage. The read-out and binary coded signal is supplied to a PLL 36 and a data reproducing circuit 37. In the PLL 36, a clock signal is extracted and then reproduced from the read-out signal and this clock signal is supplied to the data reproducing circuit 37 by which the binary coded data is reproduced. The binary coded data reproduced is supplied to a data processing circuit 38 in which it is processed properly by using the clock signal from the PLL 36.

As an optical card, there is known such one in which an optically readable mark (track mark) is formed at the position corresponding to each of the tracks, whereby it is possible to know the address of the track to be read by using this mark M and an arbitrary track can be selected and then read out.

FIG. 7 illustrates one example of such optical card, in which a plurality of parallel tracks T are formed on a rectangular card substrate vertical to its reference end face 11a, an information signal is recorded on each of the tracks T by the arrangement of the pits so as to be optically readable as mentioned before and a rectilinear mark M of straight line-shape is formed in parallel to each of the tracks T at the position on the extension above each of the respective tracks T. This mark M is made to be optically readable. For example, when the reflectivity of light in the pit portion of the track T is selected to be low as compared with other portion, the reflectivity of the mark M is also selected to be low. On the contrary, when the reflectivity of light in the pit portion of the track T is selected to be high as compared with other portion, the reflectivity of the mark M is also selected to be high.

FIG. 8 shows one example of a photo detecting element used in a reader applied to such an optical card. A photo detecting element 20 supported on a support plate 19 is formed of a photo detecting element 21 which reads a track T on a card 11 and a photo detecting element 22 located at the upper side thereof. The photo detecting element 21 is such one in which a plurality of detecting elements 21a are arranged rectilinearly similar to the afore-mentioned photo detecting element 10 and also the photo detecting element 22 is formed by arranging a plurality of detecting elements 22a rectilinearly. However, the photo detecting element 22 is constructed such that the sum of the outputs from the plurality of detecting factors 22a is delivered as the output of the photo detecting element 22.

Though not shown, the optical system of such reader is constructed such that a light from an irradiating light source is introduced into the card 11 so as to have the length not only corresponding to the length of the track T of the card 11 in FIG. 7 but also extending to the length of the mark M, the light for reading the mark M in FIG. 7 is projected onto the photo detecting element 22 and the light for reading the track T is projected onto the photo detecting element 21.

The electrical construction of the prior art optical card reader is as shown, for example, in FIG. 9 and as shown in the figure, the photo detecting elements 21 and 22 are formed such that a plurality of light receiving elements 21r and 22r and transfer elements 21t and 22t corresponding to the former one by one are located across a gate g, respectively.

At first, the gate g is closed during a contant period (accumulation period) and the charges generated by the light are accumulated in the respective light receiving elements 21r and 22r. Then, the gate g is momentarily opened to transfer the accumulated charges to the corresponding transfer elements 21t and 22t in parallel to one another and the accumulation of charges in the light receiving elements 21r and 22r is started again. The charges transferred to the respective transfer elements 21t and 22t are scanned by a scanning signal (a read clock) from a scanning circuit 31 and are read out as a series signal during a constant period (scanning period).

The read-out signal as an output of the photo detecting element 21 is a discrete analog signal generated at the unit of the detection elements 21a. It is amplified to a predetermined level by an amplifier 32, supplied through a sample and hold circuit 33 and a low pass filter 34 so as to be made as a successive analog signal and then fed to a comparator 35. The input signal to the comparator 35 is converted to a binary coded signal on the basis of the comparison that the voltage thereof is higher or lower than a reference voltage. The binary coded read out signal is supplied to a PLL 36 and a data reproducing circuit 37. In the PLL 36, a clock signal is extracted and reproduced from the read-out signal and the resulting clock signal is supplied to the data reproducing circuit 37 which reproduces the binary coded data. The binary coded data thus reproduced is supplied through a gate 39 to a data processing circuit 38 in which it is properly processed by using the clock signal from the PLL 36.

The track mark detecting signal, which is an output from the track mark photo detecting element 22, is supplied through an amplifier 23 to the gate 39 and thereby the gate is opened so that the data reproduced by the data reproducing circuit 37 is transferred to the data processing circuit 38 only when it is the information of the track.

As described before, upon reading, the optical card is transported in the direction perpendicular to the track and the images of the respective tracks projected onto the photo detecting elements are read out by the electrical scanning.

Here, three pits P1, P2 and P3 belonging to adjacent arbitrary three tracks and aligned along the card transportation direction 3 as shown in FIG. 10 will be considered. The incident light amounts onto the particular photo detecting elements corresponding to the pits P1 to P3 are periodically changed in response to the transportation of the card as shown in FIG. 11. In other words, the incident light amounts become maximum at time points tc1, tc2 and tc3 at which the centers of the projected images of the pits P1, P2 and P3 coincide with the centers of the photo detecting elements. While, they become minimum at time points at which the intermediate portions between the respective pits are projected onto the photo detecting elements, in other words, at intermediate time points tm1 between the time points tc1 and tc2 and tm2 between the time points tc2 and tc3.

However, the scanning period of the track to which the pit P2 belongs falls in a range between the two time points tm1 and tm2 at which the photo detection outputs become minimum across the time point tc2 at which the photo detection outputs become maximum. So, the read-out signal obtained from the photo detecting elements contain an invalid component which is provided by the projected image on the intermediate portion between the adjacent tracks. There is then a problem that a contrast of a pit corresponding signal by the projected image of the pit will be deteriorated.

When the scanning timing is displaced by any cause and then the scanning period becomes from tc1 to tc2 or from tc2 to tc3, the informations recorded on the two tracks are read out simultaneously or such a state equivalent to a case in which the two tracks are superposed is presented. Thus, a correct information can not be read. Further, even in the case of the optical card provided with the track mark M as shown in FIG. 7, when the scanning timing is displaced by any cause and the scanning period becomes from tc1 to tc2 or from tc2 to tc3, the output from the track mark detecting element 22 becomes the same as that obtained when the scanning timing is the normal one so that the gate 39 is opened. Thus, the informations recorded on the two tracks can be read out simultaneously with the problem that the correct information can not be read out, too.

In view of the above aspect, an object of this invention is to provide an optical card reader which can increase the contrast of the signal corresponding to the optically recorded loci and correctly and stably read the information recorded.

SUMMARY OF THE INVENTION

The optical card reader according to the present invention is characterized in that it comprises a light source for irradiating a reading light on a track of an optical card in which respective informations are recorded on a plurality of parallel tracks by the arrangement of optically recorded loci to be optically read out therefrom so as to read the information, a photo detecting element to read out the information recorded in the track from a reflected light on the optical card, a lens for projecting the reflected light from the optical card onto the photo detecting element, scanning means the scanning period of which is set such that the photo detecting element scans each track by a plurality of times, effective scanning detecting means for detecting an effective scanning in which the information can be read out by scanning the above described track a plurality of times by the photo detecting element and extracting means for extracting an output signal of the photo detecting element on the basis of the output of the effective scanning detecting means only during one scanning period of the scanning means.

BRIEF DESCRIPTION OF DRAWINGS

FIGS. 12 and 15 are block diagrams showing first and second embodiments of an optical card reader according to this invention, and FIGS. 13, 14A-D and 16A-D are a diagram and timing charts used to explain the same.

DESCRIPTION OF THE PREFERRED EMBODIMENTS

Embodiments of an optical card reader according to this invention will hereinafter be described with reference to the drawings.

Figure 6:
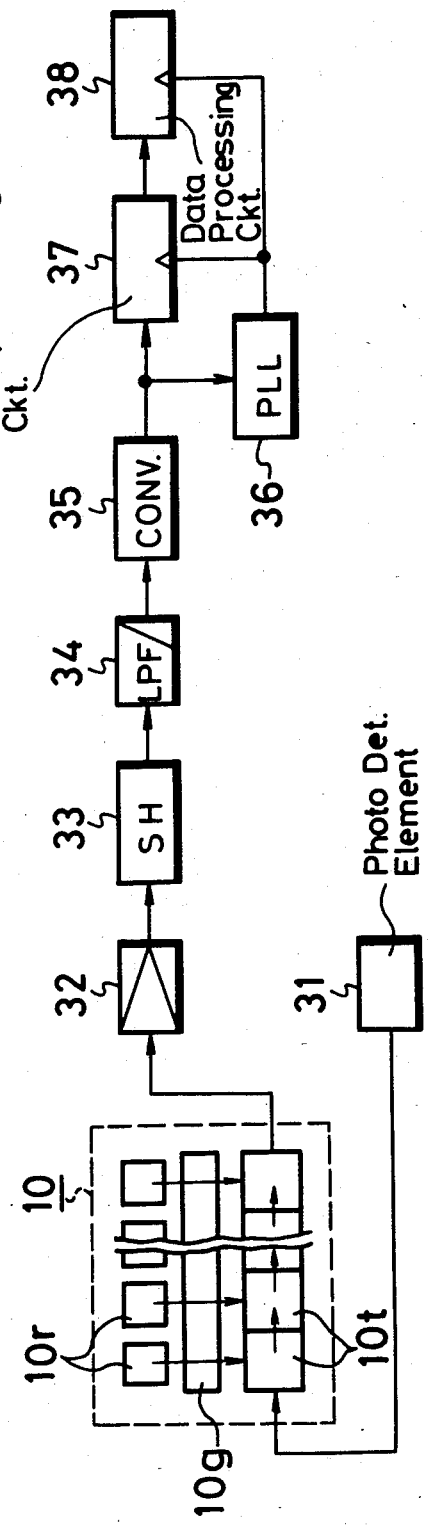
FIGS. 6 and 9 are block diagrams respectively showing examples of an electrical arrangement of the prior art optical card reader.
Figure 11:
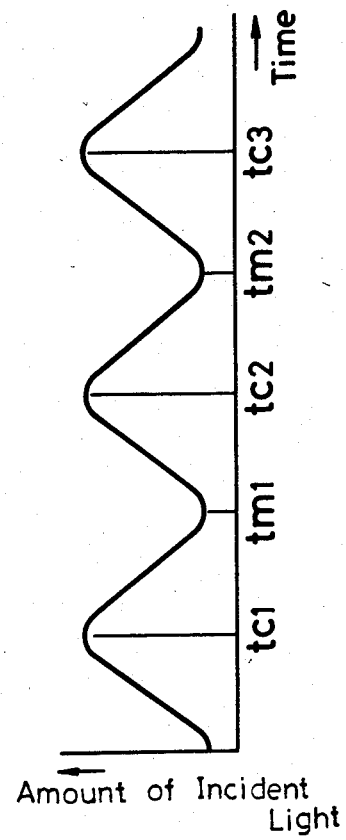
FIGS. 10 and 11 are diagrams useful for explaining a prior art apparatus.
Figure 10:
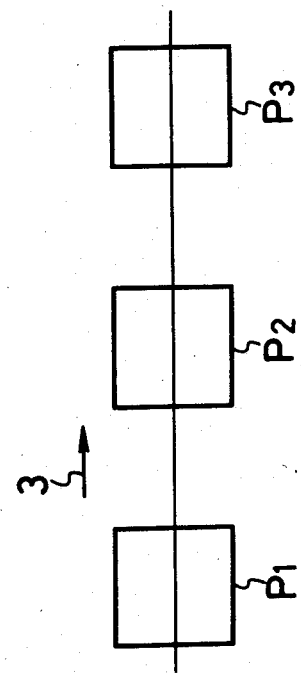
Figure 9:
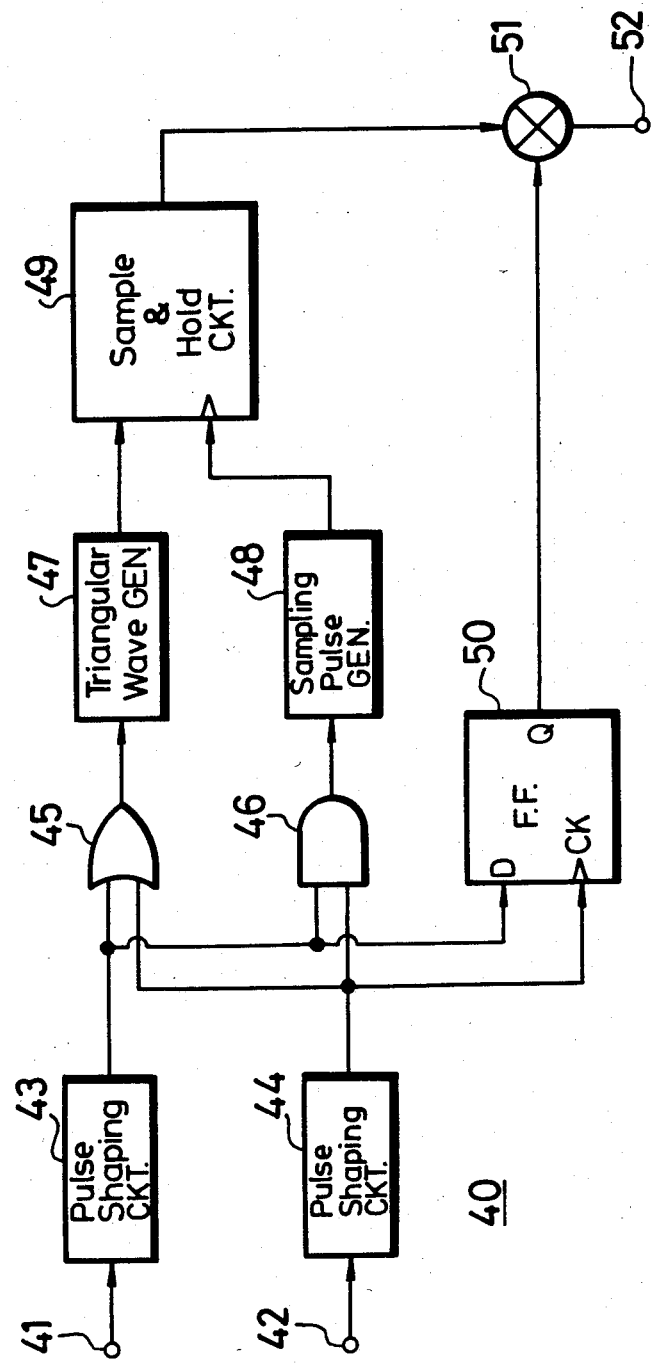

FIG. 12 shows a construction of the first embodiment of this invention. In FIG. 12, like parts corresponding to those of FIG. 6 are marked with the same references and an overlapping explanation will be omitted.

Referring to FIG. 12, a successive analog signal from the low pass filter 34 is supplied to a peak hold circuit 41. The output from the peak hold circuit 41 is supplied to a comparator 42 for use in detecting the level. The output from the comparator 42 is supplied through one scanning period delay circuit 43 to a pulse generator 44. In the case of FIG. 13, the delay amount of the delay circuit 43 may be 2 or 3 scanning periods. The output pulse from the pulse generator 44 is supplied to a gate 45 located between the data reproducing circuit 37 and the data processing circuit 38.

Figure 1:
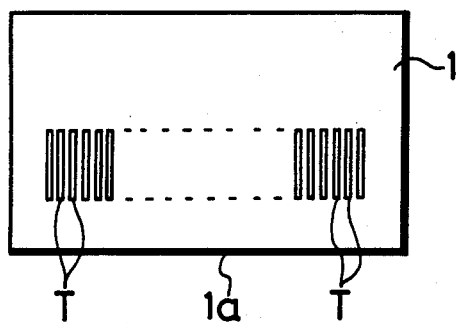
FIGS. 1, 7 and 2 are plan views showing one example of an optical card used to explain the present invention and an enlarged view of a main part thereof, respectively.
Figure 2:
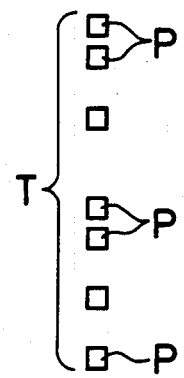
Figure 3:
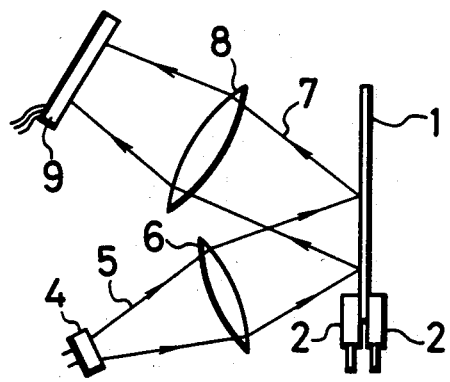
FIGS. 3 and 4 are a side view and a perspective view showing an example of a mechanism of a prior art optical card reader.
Figure 4:
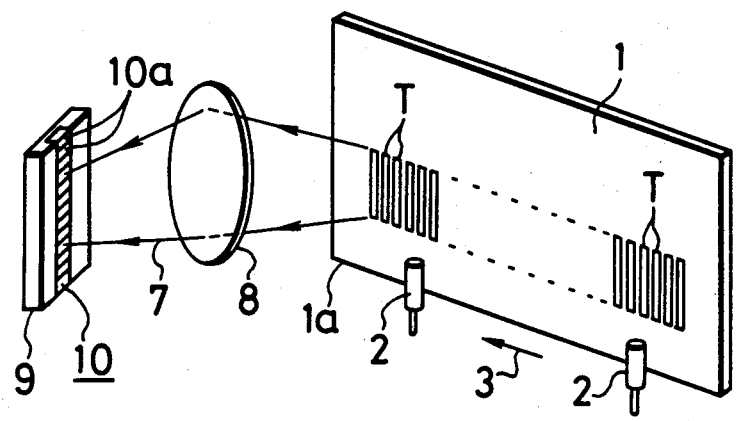
Figure 5:
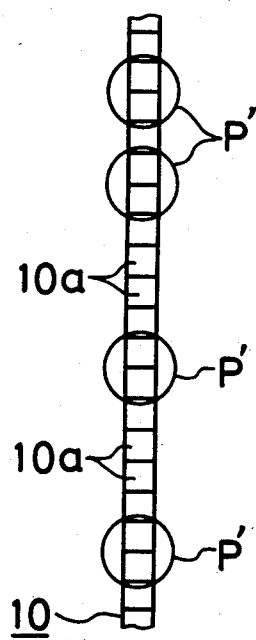
FIG. 5 is a diagram used to explain the reading state of the track.
Figure 8:
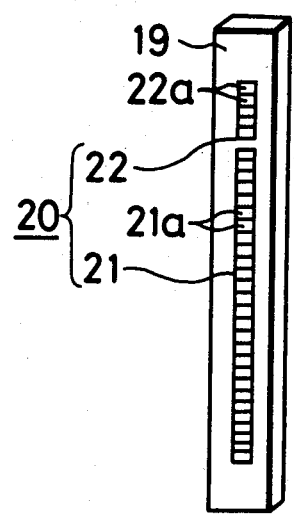
FIG. 8 is a perspective view of a photo detecting element used to explain the present invention.

The operation of the first embodiment is as follows. In this embodiment, since the recent photo detecting element and optical system are improved and hence the resolution thereof is improved, in the photo detecting element, several photo detecting elements correspond to per one pit. In order that in response to this resolution one track may be scanned a plurality of times, the length of the scanning period by the scanning circuit 31 and the card transportation speed by the rollers 2 (FIG. 4) are determined. As a result, a relative position between one pit P2 in each scanning period and one photo detecting element S corresponding thereto is moved as shown by S0 to S7 in FIG. 13. The output from the photo detecting element S is changed on the basis of the relative position between it and the pit P2 in such a fashion that as shown in FIG. 14A, it becomes lowest at S0, highest at S4 and a mean value at S2 and S6 in which the end edge of the pit crosses the center of the photo detecting element. This is also true for other tracks.

Since the peak value of the read-out signal obtained from the photo detecting element during each scanning period is the only level shown in FIG. 14A, an output signal a of the peak hold circuit 41 supplied with the read-out signal from the amplifier 32 to the low pass filter 34 becomes the same as shown in FIG. 14A. If the mean value (corresponding to S2 and S6 in FIG. 13) of the output signal a coincides with the reference voltage of the comparator 42, an output signal b of the comparator 42 becomes "Hi" during a period in which the output signal a of the peak hold circuit 41 becomes more than the mean value, while it becomes "Lo" during a period in which it does not reach the mean value as shown in FIG. 14B. The output signal b of the comparator 42 is delayed by one scanning period by the one scanning period delay circuit 43 as shown in FIG. 14C and then supplied to the pulse generating circuit 44 as a trigger pulse. The pulse generating circuit 44 is adapted to supply to a gate 45 a gate pulse d the pulse width of which is equal to one scanning period as shown in FIG. 14D. Accordingly, the gate 45 is opened only during one period (corresponding to S3 in FIG. 13) next to the scanning period (corresponding to S2 in FIG. 13) in which the output signal a of the peak hold circuit 41 reaches the mean value so that as will be clear from FIG. 14A, an accurate data stably reproduced from the read-out signal high in contrast by the data reproducing circuit 37 is transferred to the data processing circuit 38, thus the positive data processing being carried out.

As will be clear from FIG. 14A, if the output signal from the photo detecting element corresponds to that from a range of the scannings S3 to S5 in which the level thereof exceeds the mean value, the read-out signal, which is high in contrast, can be obtained similarly as described above so that the delay time of the delay circuit 43 may be 2 or 3 scanning periods.

Figure 7:
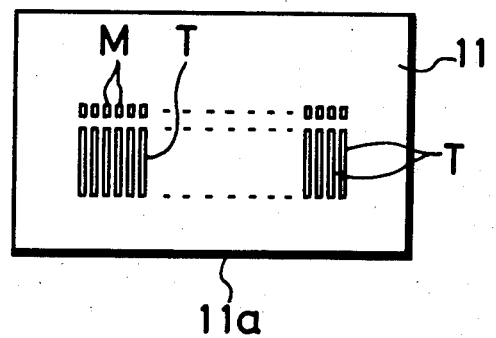

The second embodiment which reads the optical card having the track marks shown in FIG. 7 will be described with reference to FIG. 15. In FIG. 15, reference numeral 20A designates a photo detecting element which is formed such that the photo detecting elements 21 and 22 as described above are coupled together and from which there are generated in series signals which result from reading the mark M and the track T of the optical card 11 shown in FIG. 7. Reference numeral 46 designates a track mark detecting circuit which includes a counter. This mark detecting circuit 46 is supplied with a reproduced data signal from the data reproducing circuit 37 and the clock signal from the PLL 36. The output of the mark detecting circuit 46 is supplied through one scanning period delay circuit 47 to a pulse generating circuit 48. In the case of FIG. 13, the delay amount of the delay circuit 47 may be 2 or 3 scanning periods. The output pulse from the pulse generating circuit 48 is supplied to a gate 39 located between the data reproducing circuit 37 and the data processing circuit 38.

Figures 16A, 16B, 16C, 16D:
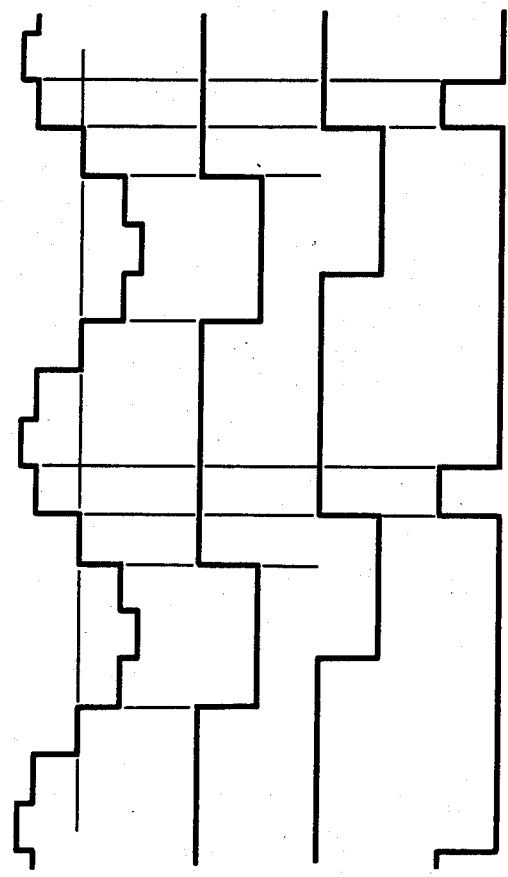

The operation of the second embodiment is as follows. That is, similarly to the first embodiment, a relative position between one pit P2 in each scanning period and one photo detecting element S corresponding thereto is moved as shown by S0 to S7 in FIG. 13. Depending on the relative position between it and the pit P2, as shown in FIG. 16A, the output of the photo detecting element S becomes lowest at S0, highest at S4 and a mean value at S2 and S6 in which the end edge of the pit crosses the center of the photo detecting element. This is also true for other tracks.

On the other hand, a relationship between the track mark and the photo detecting element is also similar as described above so that the mark is detected by the scannings of S2 to S6 in which the end edge of the mark crosses the photo detecting element.

That is, when the front edge portion of an arbitrary track mark is read by the photo detecting element 20A at S2, a mark reproduced data having a predetermined pit length m is supplied from the data reproducing circuit 37 to the mark detecting circuit 46. The counter in the mark detecting circuit 46 counts the pit length m of this mark reproduced data on the basis of the clock derived from the PLL 36 and detects that it is a predetermined mark reproduced data. Then, the output of the mark detecting circuit 46 becomes "Hi". Accordingly, an output signal b of the mark detecting circuit 46 becomes "Hi" during a scanning period in which the track mark is detected as shown in FIG. 16B and "Lo" during the period in which the track mark is not detected. The output signal b from the mark detecting circuit 46 is delayed by one scanning period by the one scanning period delay circuit 47 as shown in FIG. 16C and then supplied to the pulse generating circuit 48 as a trigger pulse. The pulse generating circuit 48 is adapted to supply to the gate 39 a gate pulse d the pulse width of which is equal to one scanning period as shown in FIG. 16D. Accordingly, the gate 39 is opened only during one period (corresponding to S3 in FIG. 13) next to the scanning period (corresponding to S2 in FIG. 13) in which the track mark is detected by the mark detecting circuit 46 so that as will be clear from FIG. 16A, an accurate data, which is stably reproduced from the read-out signal having the high contrast by the data reproducing circuit 37, is transferred to the data processing circuit 38 and thus the positive data processing can be carried out.

Further, as will be clear from FIGS. 13 and 16A, if the photo detecting element falls in a range of the scanning periods S3 to S5 located at the central portion of the pit and the mark, the read-out signal having the high contrast can be obtained similarly as above so that the delay time of the delay circuit 47 may be 2 or 3 scanning periods.

Furthermore, in this embodiment, the scanning is carried out a plurality of times per track so that even if the scanning timing is displaced, the informations on the two tracks can not be read out simultaneously unlike the prior art.

It can be very easily understood by those who are skilled in the art that the present invention is not limited to the above embodiments but various modifications and variations such as when an m-bit shift register and a digital comparator are used as the mark detecting circuit and so on can be effected.

According to the present invention as set forth above in detail, since the photo detecting element is scanned a plurality of times per one track to thereby detect the fact that the photo detecting element reads the track mark or that the output of the photo detecting element becomes more than the predetermined level is detected to thereby extract a signal read out during one scanning period in which the level of the photo detecting element exceeds the predetermined level, the contrast of the signal corresponding to the optically recorded locus can be increased and the correct recorded information can be read out stably without reading the adjacent two tracks simultaneously.

What is claimed is:

1. An optical card reader, comprising a light source for producing a reading light for irradiating a track of an optical card in which information signals are recorded respectively on a plurality of parallel tracks by the arrangement of optically recorded loci, whereby the information signals can be read out from said track, a photo detecting element for reading the information recorded on said track by receiving reflected light from said optical card, a lens for projecting the reflected light from said optical card onto said photo detecting element, scanning means having a scanning period whereby said photo detecting element scans each of said tracks a plurality of times, effective scanning detecting means connected with said detecting element for detecting an effective scanning capable of reading said information signals from said plurality of scannings of said track by said photo detecting element, and extracting means connected with said detecting element and with said effective scanning detecting means for extracting an output signal of said photo detecting element only during one scanning period of said scanning means in response to the output of said effective scanning detecting means, said effective scanning detecting means comprising level detecting means for detecting when the output signal level of said photo detecting element becomes higher than a predetermined level, and delay means for delaying the output of said level detecting means, said delay means effecting a selected delay interval, during said plurality of scannings, in which the level of the output signal of said photo detecting element exceeds said predetermined value in at least one scanning period of said scanning means.

2. An optical card reader according to claim 1, characterized in that said optical card is provided at an extended portion of an end portion of at least one side of said tracks with at least one track mark, a mark detecting element for detecting said track mark and the read operation of said photo detecting element is controlled by the detection output of said mark detecting element.

3. An optical card reader according to claim 2, characterized in that said mark detecting element is located at one end portion of said photo detecting element.

4. An optical card reader according to claim 3, characterized in that said effective scanning detecting means is formed of mark detecting means for detecting an output of said track mark detecting element and delay means for delaying an output signal of said mark detecting means.

5. An optical card reader according to claim 4, characterized in that a delay amount of said delay means is at least one scanning period of said scanning means within a range of until a trailing edge of said mark is detected by said mark detecting element after said mark was detected by said mark detecting element.

* * * * *